United States Patent Office 3,546,781
Patented Dec. 15, 1970

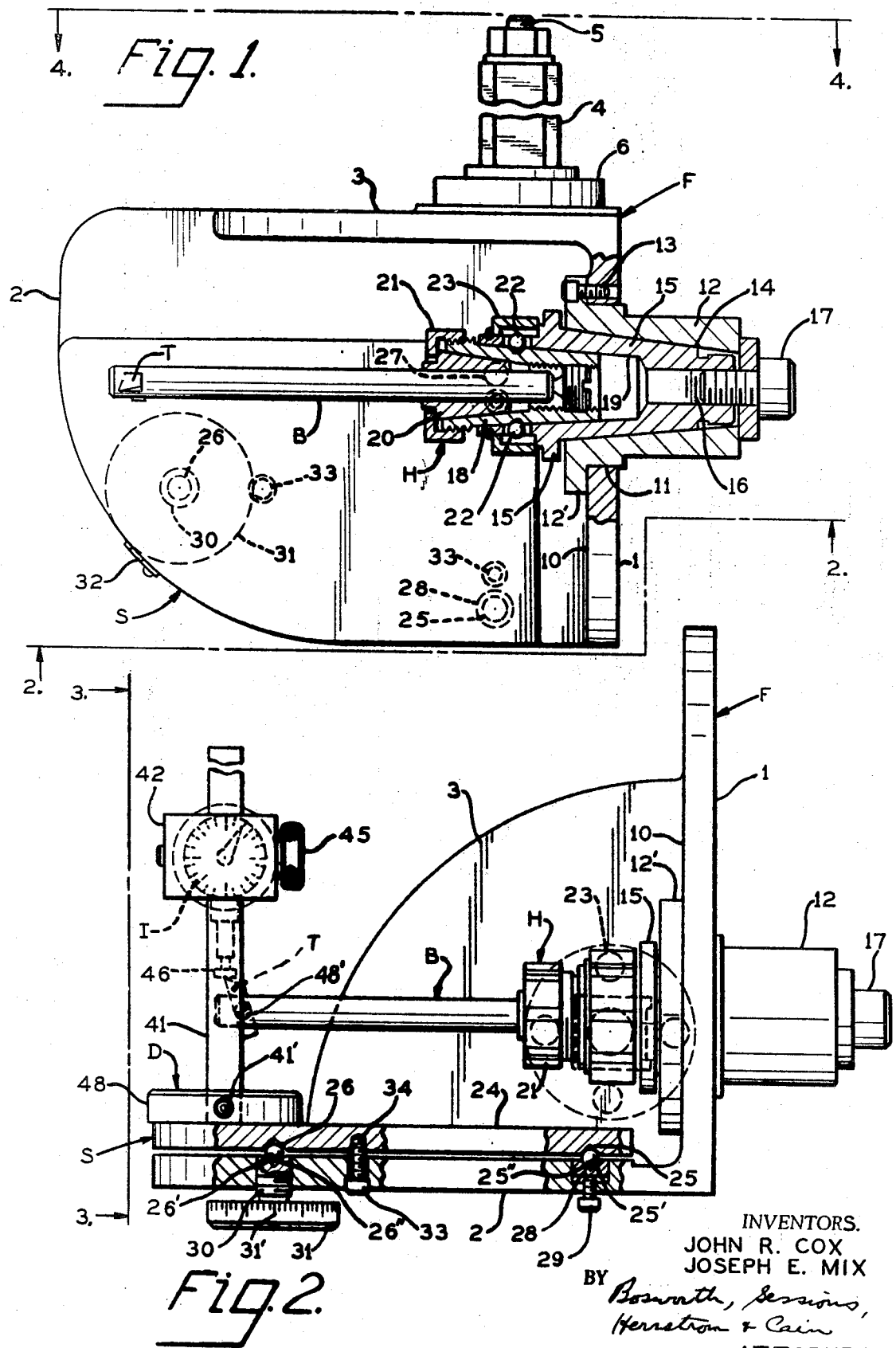

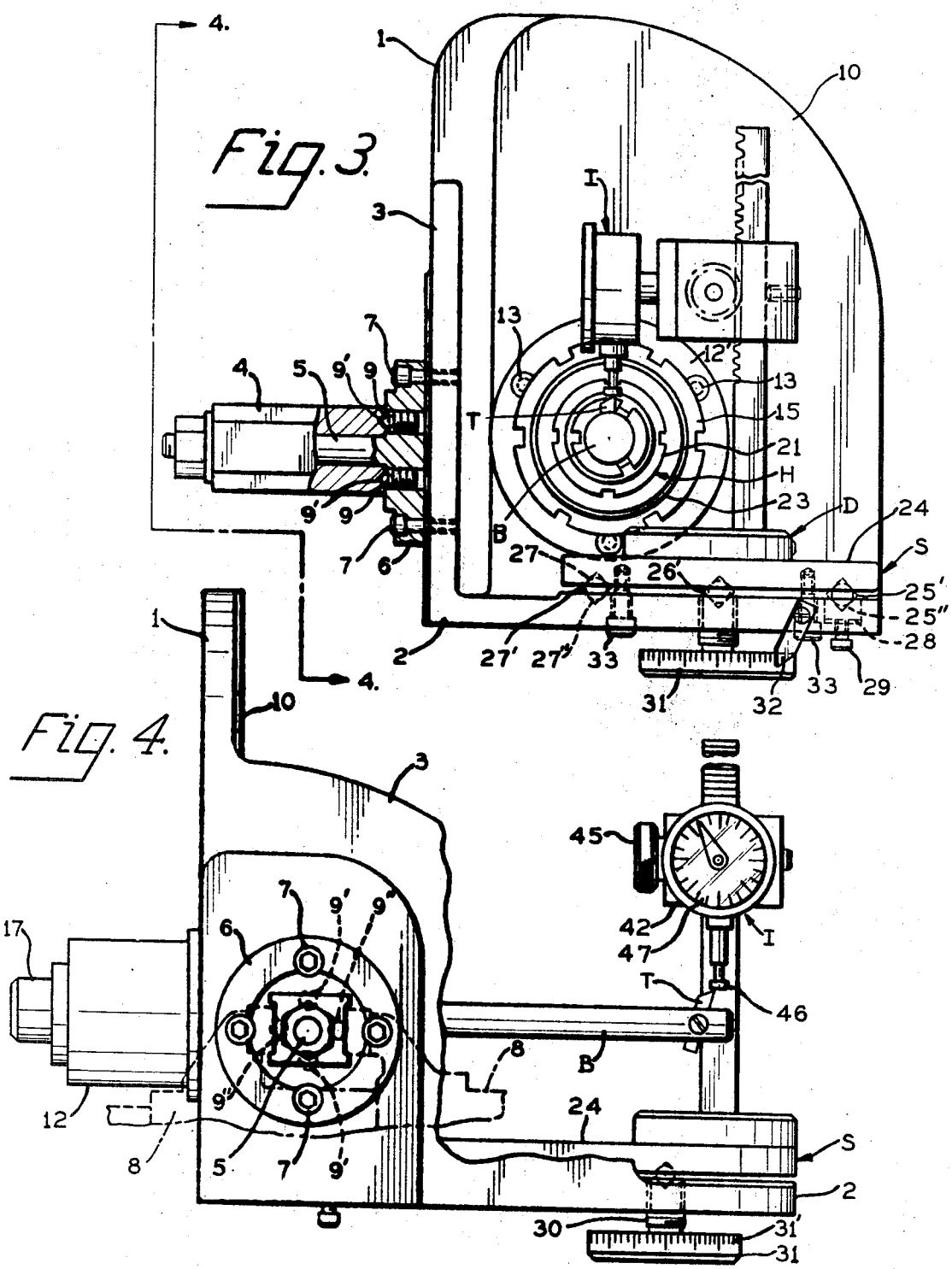

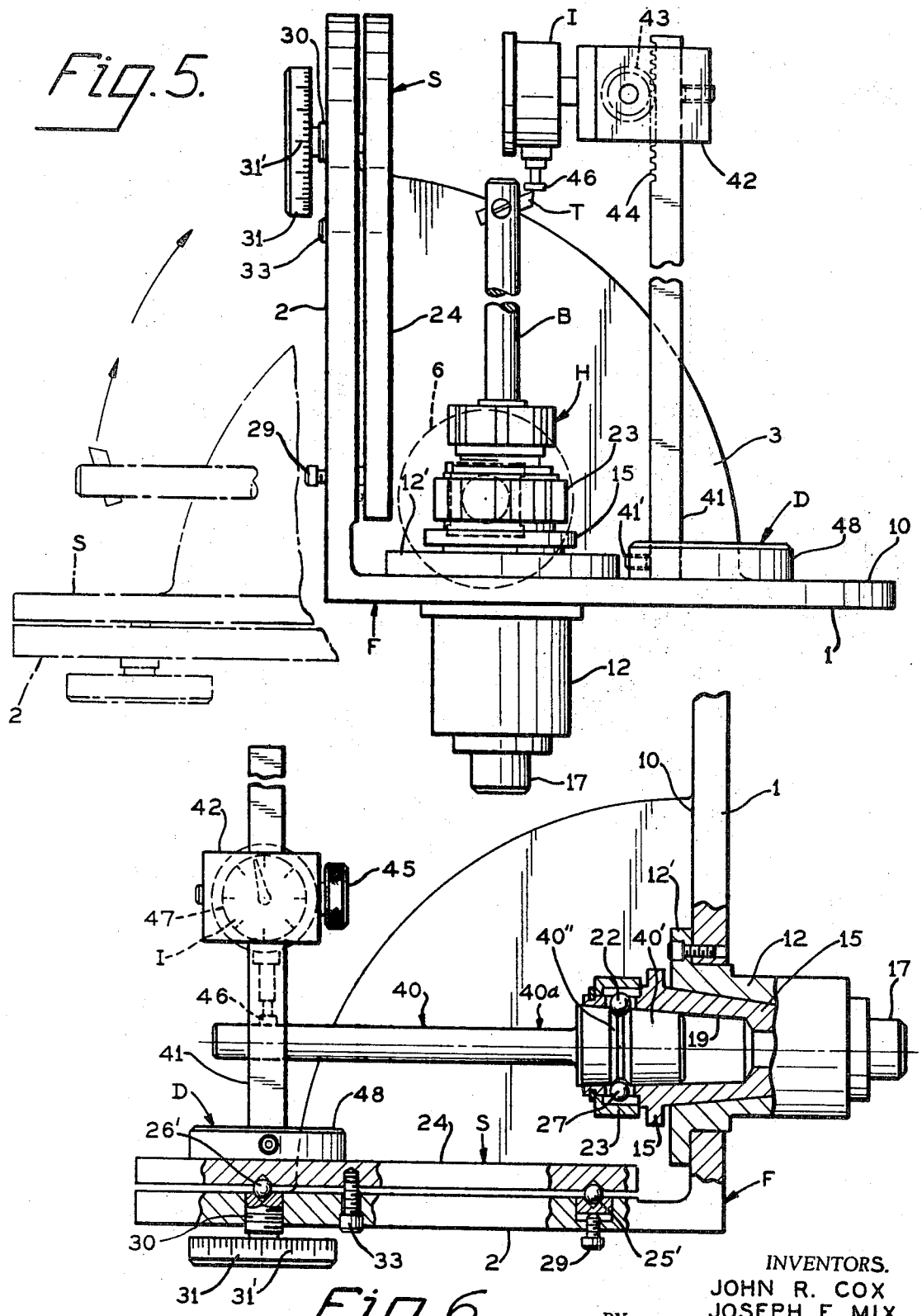

---

3,546,781
TOOL PRESETTING DEVICE
John R. Cox, Lakewood, and Joseph E. Mix, Cleveland, Ohio, assignors to Balas Collet Company, Cleveland, Ohio, a corporation of Ohio
Filed Jan. 21, 1969, Ser. No. 792,309
Int. Cl. B27g 23/00
U.S. Cl. 33—185    13 Claims

ABSTRACT OF THE DISCLOSURE

A tool presetting fixture including a frame structure having wall portions extending at substantially 90° to each other and an adapter having a longitudinal bore therein adapted to support a tool holder and mounted in one of the wall portions, the axis of the bore in the adapter extending substantially normally to the plane of the wall in which it is mounted. The other wall of the frame structure supports a subplate on an adjustable three point support whereby the subplate may readily be adjusted to extend at 90° to the surface of the wall in which the adapter is mounted and substantially exactly parallel to the common longitudinal axis of the tool holder and adapter. To preset a boring tool to bore a hole of an exact given diameter the boring bar is mounted in the tool holder which in turn is mounted in the adapter and the boring tool is adjusted in the bar so that, when measured with an accurate indicator device, its cutting point will be a predetermined distance from the surface of the subplate, the distance from the subplate to the tool holder axis being known.

BACKGROUND OF THE INVENTION

In metal machining operations boring bars are commonly used to bore holes in parts being machined. Such bars consist essentially of a rigid bar member having at its outer end a tool bit secured so that its cutting point or edge may be adjusted toward or away from the longitudinal center line of the bar. When such a bar is, for example, mounted on the tool slide of a machine tool and fed into a bore in a part supported on the rotating spindle of the machine, a hole will be bored to a given diameter depending on the distance of the cutting point of the tool from the center of rotation of the part (i.e. the common center line of the machine spindle and tail stock). In production operations it is desirable to be able to replace a boring bar and its cutting tool when the tool becomes worn or dull, or needs changing for other reason, without having to reset the tool in the bar while the bar is in the machine by a cut and try procedure involving making successive settings of the tool and taking successive cuts from the work until the exact desired diameter of hole is obtained. To facilitate such interchange of boring bars, or to enable a boring bar to be installed in a given machine tool with the knowledge that it will bore a hole of an exact given diameter, devices have been proposed for presetting the cutting tool in the boring bar so that it projects an exact known distance from the axial center line of the tool holder in which the boring bar is mounted. Prior to the present invention however such devices have been complex and have required extreme accuracy in manufacture with resulting high cost.

SUMMARY OF THE INVENTION

Accordingly, it is an object of the present invention to provide a low cost, effective tool presetting fixture for accurately and quickly presetting boring bar tools away from the machine in which the bar is to be used. The present tool presetting device consists essentially of a frame structure having two walls or flanges extending substantially at right angles to each other, the face of only one of these walls being finished to a substantially flat, plane condition. This wall will be referred to as the angle plate portion of the frame structure and, in the same machine set-up as the facing operation on the surface thereof, a bore is machined in this wall with its axis extending at substantially exactly 90° to the finished face of the wall. A spindle adapter is mounted in this bore and located so that the axis of a tapered tool holder adapter receiving recess therein also extends at substantially exactly 90° to the finished surface of the angle plate. Tool holder adapters of different designs, depending on the type of tool holder being used to support the boring bar, may be mounted in the spindle adapter with assurance that, when a tool holder carrying a boring bar is supported therein, the axis of the tool holder will extend exactly normally to the face of the angle plate and will be coaxial with the adapters.

The other wall of the frame structure forms a supporting base plate portion for an adjustable subplate which is supported at three points thereon. Two of the subplate support points are adjacent the angle plate and the third is disposed to form a triangle with the other two and is adjustable by screw means or the like so that the subplate may be tilted relative to the angle plate until it is disposed in a position with its upper plane surface extending substantially exactly 90° to the bar supporting wall and substantially exactly parallel to the axis of the bore in the spindle adapter. The upper surface of the subplate is accurately finished to provide a plane sliding support for the base of an indicator stand which has an upwardly extending column on which is adjustably mounted a dial indicator or the like. This indicator stand may be moved on the plane upper surface of the subplate until the plunger of the indicator is positioned directly above the cutting point or edge of the cutting tool of the boring bar which is to be preset and which is mounted in a tool holder which is supported in the angle plate as described above.

With such an arrangement, the exact height of the longitudinal center line of the spindle adapter above the upper surface of the subplate having been measured and noted, it is only necessary to set the cutting point of the tool by the dial indicator so that it is spaced vertically above the adapter center line by a distance equal to the radius of the bore it is desired cut in the work piece. When such a setting of the tool is made it will be known that the cutting edge of the tool will be positioned the desired distance from the center line of the tool holder and it will also be known that, in use, the tool will have its cutting point the exact distance from the center of the machine spindle to bore a hole of the exact desired diameter. Thus the necessity for setting a boring tool by the cut and try method while mounted in the machine is eliminated and any desired number of boring bars may be preset so that they all will give exactly the same results in use.

BRIEF DESCRIPTION OF THE DRAWINGS

FIG. 1 is a plan view of a tool presetting device of the present invention illustrated with a boring bar and boring tool positioned therein for presetting of the tool in the bar.

FIG. 2 is a front elevational view taken substantially on line 2—2 of FIG. 1 and also showing the indicator stand and dial indicator in position to measure the exact setting of the cutting point or edge of the boring tool.

FIG. 3 is an end elevational view taken substantially on line 3—3 of FIG. 2.

FIG. 4 is a rear elevational view taken substantially on line 4—4 of FIGS. 1 and 3, a part of the stiffening web being broken away better to illustrate the dial indicator, etc.

FIG. 5 is an elevational view of the apparatus shown in FIG. 2 but with the presetting device rotated 90° on its trunnion support into position for setting the length of a boring bar and tool assembly.

FIG. 6 is an elevational view generally similar to FIG. 2 but illustrating a spindle alignment bar in position for setting the subplate exactly parallel to the axis or center line of the spindle adaptor bore and accurately measuring the distance from the subplate indicator stand supporting surface to said center line.

DESCRIPTION OF THE ILLUSTRATED EMBODIMENT

Referring to the drawings, the tool presetting device of the present invention has a frame structure F, preferably an integral casting, which comprises an angle plate 1 and a base plate 2 extending substantially at right angles to each other and connected at one edge by a stiffening web 3. When the device is used for presetting a boring tool in a boring bar to bore a hole of a given predetermined diameter, the frame structure F is supported with the base portion 2 horizontally disposed and the angle plate 1 extending vertically upwardly therefrom as clearly seen in FIGS. 2, 4 and 6. As illustrated, the frame F has a supporting trunnion 4 rotatably mounted on a shaft 5 which is secured to and projects from a plate 6 which in turn is mounted on the outer face of the stiffening web 3 as by screws 7 (see FIG. 3).

The trunnion 4 may conveniently be held in any suitable rigid support means, such as the bench vise indicated in phantom lines at 8 in FIG. 4, and is located on shaft 5 by means of spring backed detent balls 9 which engage correspondingly spaced conical recesses 9' in the end of trunnion 4 as seen in FIG. 3. This end of trunnion 4 also has another set of ball receiving recesses 9" (see FIG. 4) positioned at 90° to recesses 9' so that, when it is desired to position the frame structure F for vertical tool setting as seen in FIG. 5, the entire presetting device assembly may be rotated from a position with the base plate portion 2 horizontal (FIG. 2) into position where the balls 9 snap into the pair of recesses 9" and hold the frame structure in position with the base plate portion 2 vertical (FIG. 5).

During manufacture of the presetting device the inner face 10 of the angle plate 1 is accurately finished to a flat plane surface and while set up for this finishing operation a spindle adapter bore 11 is formed therein with its axis accurately perpendicular to the surface 10. The spindle adapter sleeve 12 is secured in the bore 11 as by screws 13 and has a tapered bore 14 the longitudinal center line of which extends accurately perpendicularly to the outer face of flange 12' which is held against the face 10 of the angle plate 1 by screws 13.

To support the tool holder H, which carries the boring bar B during presetting of the boring tool T, a tool holder adapter 15 is supported in the tapered bore 14 of the spindle adapter 12. This tool holder adapter 15 has a threaded bore 16 at one end which is engaged by a screw 17 which, when tightened, draws the tool holder adapter 15 firmly into accurately centered coaxial position in the spindle adapter 12.

The tool holder adapter 15 is designed to receive the particular type of tool holder being used to support the boring bar B and it will be understood that these tool holder adapter may be varied in accordance with the particular tool holder in use. As illustrated (see FIG. 1), the tool holder H includes a tapered shank portion 18 which fits the tapered bore 19 in the adapter 15, a contractable collet 20, and a nose piece 21 which when tightened causes the collet to grip the boring bar B. The tool holder H is detachably secured in the tool holder adapter 15 by suitable means such as retaining balls 22 actuated by a cam lock ring 23 on the tool holder adapter 15 to force the shank 18 firmly into seated position in adapter 15.

As the axis of the tapered bore 14 in the spindle adapter 12 extends accurately perpendicularly to the face 10 of the angle plate 1, and as tool holder adapter 15 and the tool holder H are accurately manufactured so that the tapered shanks thereof are concentric about their longitudinal axes, it will be seen that when a boring bar B is gripped in the tool holder H and the tool holder is mounted in the adapter 15 the axis of the boring bar at the tool holder will extend in an accurately perpendicular direction relative to the surface 10 of the angle plate 1. Furthermore the longitudinal axis of the portion of the boring bar that is gripped in the collet 20 will lie on the common axis of the adapters 12 and 15.

In order to provide a flat plane surface which extends accurately at right angles to the surface 10 of the angle plate 1 and accordingly accurately parallel to the longitudinal axis of the tool holder H and adapters 12 and 15, and to avoid the difficult and expensive machining procedures which would be required to form a finished surface on the base plate 2 of frame F which would extend accurately perpendicularly to the surface 10, a subplate S is provided. This plate has its upper surface 24 finished smooth and flat to provide support for the dial indicator stand D as will be later described. Three spaced triangularly arranged points of support for subplate S on base plate portion 2 are provided at conical recesses 25, 26 and 27 formed in the bottom of subplate S, the recesses 25 and 27 being substantially equally spaced from the angle plate 1 and the recess 26 being spaced from recesses 25 and 27 at a point more remote from the angle plate 1 when the subplate is in position as seen in FIGS. 1 and 2.

Adjustable support for the subplate S on base plate portion 2 is provided on three bearing balls 25', 26' and 27'. Ball 27' is supported in a conical recess 27" in the base plate portion 2 (see FIG. 3). Ball 25' is supported in a conical recess 25" in a block 28 in the base plate portion 2, said block 28 being vertically adjustable by means of a screw 29. Ball 26' is supported for vertical adjustment in a conical recess 26" in the upper end of a threaded adjusting screw member 30 which has threaded engagement in an aperture extending through base plate 2 in alignment with the conical recess 26 in the subplate S.

Mounted on the lower end of the screw 30 is a graduated adjusting dial 31 and an indexing pointer 32 is secured to the edge of base plate portion 2 of the frame structure F and extends downwardly with its point adjacent the outer graduated perimeter of adjusting dial 31 (see FIG. 3) to provide means for indicating the position and degree of movement of dial 31. The diameter of the bearing balls 25', 26' and 27' is so proportioned relative to the depth and form of recesses 25, 26 and 27 that when subplate S rests on the balls its under surface is spaced above the upper surface of base plate portion 2 as seen in FIG. 2. This spacing permits the desired tilting adjustment of the position of subplate S as will be later described.

In order to retain the subplate S in position after adjustment three retaining screws 33 extend freely through holes in the base plate 2 adjacent the locations of the supporting balls 25', 26' and 27' into threaded holes 34 in subplate S. These screws are provided merely to prevent displacement of the subplate S from its adjusted position, either accidentally or when the frame structure F is rotated into its vertical position as seen in FIG. 5, and they are never tightened more than hand tight so as to avoid any possible distortion of the subplate S.

In order accurately to preset a boring tool in a boring bar to bore a hole of predetermined diameter it is essential that the upper finished surface 24 of the subplate S, on which the dial indicator stand D is supported during the presetting operation, extend substantially exactly parallel to the common longitudinal axis of the bores in the spindle adapter 12, the tool holder adapter 15, and the tool holder H. Reference now is made to FIG. 6 which illustrates the set up for adjusting the subplate S to such a position. An integral one piece spindle alignment bar 40 is mounted in the tool holder adapter 15 in the same manner that the tool holder H is held therein in FIG. 1. This alignment bar 40 has a cylindrical shaft portion 40ª and a coaxial enlarged tapered shank portion 40′ contoured to fit the tapered bore 19 in the tool holder adapter 15 and annularly grooved at 40″ to receive the retaining balls 22.

It will be understood that, as the shaft portion 40ª is ground to be accurately cylindrical and accurately concentric with the tapered end portion 40′, the longitudinal axis of the shaft portion 40ª will coincide with the longitudinal axis of the tool holder adapter 15 and the spindle adapter 12 and will extend substantially exactly perpendicularly to the finished face 10 of the angle plate 1.

The subplate S, as has been previously explained, has a three point support on the balls 25′, 26′ and 27′ which in turn are supported on the base plate 2 of the frame structure F. The support point 26 is adjustable in the base plate portion 2 whereby the angle between the plane of the indicator stand supporting surface 24 of subplate S and the longitudinal axis of the bore 14 in the spindle adapter sleeve 12 is adjustable for proper positioning of the surface 24 as will appear from the following description.

When the subplate S is first placed on the three supporting balls it ordinarily will not have its upper surface 24 lying exactly 90° to the surface 10 of the angle plate 1 and accurately parallel to the adapter axis. The degree of departure from parallelism may be determined by mounting a dial indicator I on the vertical post 41 of the indicator stand D and measuring (in well known manner) the distance between surface 24 and the common longitudinal axis of the boring bar supporting means on the angle plate portion 1 of the frame structure F.

As seen in FIGS. 2 and 3, the indicator I is mounted on a vertically adjustable head 42 which carries a spur gear 43 meshing with a rack 44 on the post 41. Rotation of the hand wheel 45, which is connected to the gear 43, will move the head 42 and indicator I upwardly or downwardly until it is in proper position for the contacting head or anvil 46 of the indicator I to engage the top of the alignment bar 40.

The stand D is first positioned as seen in FIG. 6 and a reading of the indicator dial 47 taken to measure the height of the shaft portion 40ª above the surface 24 at a point spaced away from angle plate portion 1. As the diameter of shaft portion 40ª is known this measurement determines the height of the longitudinal axis of portion 40ª above surface 24. The stand D is then slid on its base 48 across the surface 24 of the subplate S until the indicator head 46 engages the shaft portion 40ª closely adjacent the enlarged end portion 40′ and another reading is taken on the dial 47. If the height as measured by the indicator reading adjacent the inner (right hand in FIG. 6) end of shaft portion 40ª is greater than the reading adjacent the outer end it shows that the angle between the surface 24 of subplate S and the surface 10 of angle plate 1 is less than 90° Conversely, if the indicator reading adjacent the inner end of the shaft portion 40ª is less than the reading when the indicator is substantially above the outer bearing ball 26′ as seen in FIG. 6 the angle between the surfaces 24 and 10 is greater than 90°. In either event the surface 24 is not parallel to the common axis of the alignment bar 40 and the adapters 12 and 15. By suitable rotation of the adjusting wheel 31 the position of the surface 24 may readily be so adjusted that surfaces 10 and 24 are substantially exactly 90° apart and surface 24 is substantially exactly parallel to the bar axis and the axis of the adapters 12 and 15.

This parallel condition is established when the reading of the dial 47 of the indicator I is the same along the entire length of the shaft portion 40ª of alignment bar 40. By correlating the pitch of the thread on the adjusting screw 30 with suitable calibration marks 31′ on the dial 31 the amount of tilt imparted to the subplate S by the ball 26′ for any given degree of rotation of the dial 31 may be determined and thus the setting of the subplate exactly parallel to the common axis of the spindle adapter 12 and the tool holder adapter 15 facilitated.

During this adjustment of the position of the subplate S the holding screws 33 are backed off or removed. Vertical adjustment of the position of the ball 25′ by means of the screw 29 permits the transverse angular position of the surface 24 of subplate S to be adjusted so that it is substantially parallel to the longitudinal axis of the supporting trunnion 4 and perpendicular to stiffening web 3. However, a slight misalignment of surface 24 in this direction will not affect the accurate presetting of a tool in a boring bar.

After the subplate S has been accurately positioned in the manner above described the exact height of the longitudinal axis of the bore in the tool holder adapter 15 is determined by measuring, with the indicator I, the exact height of the top of the bar 40 above the surface 24. By subtracting the known radius of the bar 40 from this figure the exact height of the axial center line of the adapter 15 is established.

Now, when it is desired to preset a boring tool to bore a hole of a given diameter, for example 2.500″, it is only necessary to insert the boring bar B in the tool holder H and secure the holder H in the tool holder adapter 15 as seen in FIGS. 1 and 2. The dial indicator I is now set, by means of suitable gage blocks or the like, so that it can be used to measure a distance equal exactly to the previously established height of the center line of the adapter 15 (and also of the tool holder H) above the surface 24 plus the radius of the hole to be bored, i.e. in the given example, 1.250″.

By releasing the tool holding screw 48′ in the boring bar B the cutting point of the tool T may be accurately set so that, when measured by the indicator I, it is at the exact predetermined distance above the surface 24 of the subplate S. The screw 48 is then tightened to maintain the tool in this set position and, when the tool holder H and the boring bar B are placed in a machine tool and the boring tool fed into the work to bore a hole therein, the resulting hole will be the exact diameter desired, i.e. 2.500″.

This presetting of the tool to bore the desired diameter hole may be effected even though the bar B is bent or otherwise distorted because the presetting of the tool is done relative to the axial center line of the tool holder, not to the center line of the boring bar B at the tool T. As previously noted, after the subplate S is accurately positioned the screws 33 may be hand tightened to prevent accidental dislodging of the subplate and to hold it in position when the presetting device is rotated on its trunnion support into the position shown in FIG. 5 for measuring the overall length position of the cutting edge of the boring tool from the tool holder H. It will be understood that if, after the fixture is moved to a new location or for any other reason, it is desired to check that the surface 24 of the subplate exactly parallel to the common adapter axis, it is only necessary to re-insert the spindle alignment bar 40 and repeat the adjusting operation previously described.

By providing means for supporting a tool holder or the like with its longitudinal axis normal to the surface 10 of the angle plate member 1, together with the three point support means for very accurately adjusting the inclination of the indicator stand supporting surface 24 of the subplate S so that it is exactly parallel to said longitudinal axis, an effective tool presetting device is produced without complicated structure or highly accurate and expensive machining operations.

Although the device has been described above as it is employed for presetting boring tools to produce a hole of a given diameter, it may also conveniently be used for setting the effective length of a boring bar in a tool holder. Thus, when the frame structure F is rotated through 90° on its trunnin support 4 from the position of FIG. 2 into the position of FIG. 5, the boring bar B will extend veritcally upwardly from the finished surface 10 of the angle plate 1. The dial indicator stand D is then placed on the surface 10, the post 41 having been removed from the base 48 by loosening set screw 41', and rotated so that the indicator I will extend oppositely to base 48 and be in a position (see FIG. 5) conveniently to measure the height of the cutting point of the tool T above the surface 10. The indicator I will have been vertically positioned on post 41 so that the desired distance from the surface 10 to the cutting point of tool T may be measured. The detent balls 9 (FIG. 3) serve to hold the frame structure F in either its horizontal position of FIG. 2 or its vertical position of FIG. 5. Due to the spring backing of these balls shifting of the fixture between these two positions may be effected merely by exerting sufficient twisting force to overcome the detent springs.

Although we have described the illustrated embodiment of our invention in considerable detail it will be understood that variations and modifications may be made in the specific form and arrangement of the components of the device. Accordingly, we do not wish to be limited to the exact apparatus herein shown and described but claim as our invention all embodiments therein coming within the scope of the appended claims.

We claim:

1. A tool presetting fixture including a frame structure having angle plate and base plate portions extending angularly to each other, boring bar supporting means carried by said angle plate portion and having a bore the longitudinal axis of which extends generally parallel to said base plate portion, said bore being adapted to support a boring bar, a subplate having an indicator stand supporting surface and being adjustably supported on said base plate portion, and means for varying the position of said subplate on said base plate portion whereby said indicator stand supporting surface thereof is disposed substantially exactly parallel to the said axis of said bore in said boring bar supporting means.

2. A tool presetting fixture as defined in claim 1 in which said boring bar supporting means includes a spindle adapter sleeve having a tapered bore, a tool holder adapter having a tapered shank adapted to fit said tapered bore in said spindle adapter sleeve, means for releasably retaining said tool holder adapter in said bore of said spindle adapter sleeve, and a tool holder adapted to be releasably retained in said tool holder adapter, said spindle adapter sleeve, tool holder adapter and tool holder having a common longitudinal axis which extends generally parallel to said base plate portion.

3. A tool presetting fixture as defined in claim 1 in which said subplate has three triangularly arranged points of support on said base plate portion, two of said points of support being adjacent to said angle plate portion and the third point being disposed farther away from said angle plate portion, and means for adjusting said third support point whereby the angle between the plane of said indicator stand supporting surface of said subplate and said longitudinal axis of said boring bar supporting means is adjustable.

4. A tool presetting fixture as defined in claim 3 in which said means for adjusting said third support point includes an adjusting screw having threaded engagement with said base plate portion whereby said third support point may be moved toward or away from said base plate portion.

5. A tool presetting fixture as defined in claim 3 in which said three supporting points of said subplate each comprises a bearing ball resting in a recess in said base plate portion, the diameter of said balls being proportioned relative to said recesses whereby said subplate is held in spaced relation to the adjacent surface of said base plate portion.

6. A tool presetting fixture as defined in claim 5 in which said bearing ball at said third support point is carried by an adjusting screw extending through said base plate portion and having a conical bearing ball recess at its upper end.

7. A tool presetting fixture as defined in claim 6 in which an adjusting dial having calibration marks on its periphery is mounted at the lower end of said adjusting screw below said base plate portion, and an indexing pointer is mounted on said frame structure and extends adjacent to said calibration marks on said adjusting dial.

8. A tool presetting fixture as defined in claim 1 including a plurality of base plate holding screws extending freely through said base plate portion and having threaded engagement in said subplate portion whereby said subplate may be retained in position on said base plate portion.

9. A tool presetting fixture as defined in claim 1 including a stiffening web portion extending between said angle plate portion and said base plate portion, and a supporting trunnion carried by said stiffening web portion and extending substantially perpendicularly thereto.

10. A tool presetting fixture as defined in claim 9 in which said supporting trunnion is rotatably mounted on a trunnion shaft secured to said stiffening web portion, and means for releasably retaining said supporting trunnion in two positions spaced substantially 90° apart.

11. A tool presetting fixture as defined in claim 10 including rigid support means adapted to hold said trunnion in fixed position whereby said frame structure may be positioned with said base plate portion either horizontal or vertical.

12. A tool presetting fixture as defined in claim 1 including a spindle alignment bar having a cylindrical shaft portion and a tapered shank portion, said tapered shank portion being adapted to be supported coaxially with and in said boring bar supporting means, said cylindrical shaft portion having its longitudinal axis coaxial with and forming an extension of the common longitudinal axis of its said shank portion and said boring bar supporting means when said alignment bar is mounted in said boring bar supporting means.

13. A tool presetting fixture as defined in claim 1 including a dial indicator stand adapted to be movably positioned on said indicator stand supporting surface of said subplate, said stand including vertically adjustable dial indicator support means, and a dial indicator on said support means adapted accurately to measure distances perpendicular to said indicator stand supporting surface of said subplate.

References Cited

UNITED STATES PATENTS

| | | | |
|---|---|---|---|
| 2,657,470 | 11/1953 | Allen et al. | 33—185 |
| 2,850,807 | 9/1958 | Gasper | 33—185 |
| 3,167,868 | 2/1965 | Arneson | 33—185 |
| 3,323,221 | 6/1967 | Koch | 33—185 |
| 3,336,677 | 8/1967 | Newton | 33—185 |

WILLIAM D. MARTIN, Jr., Primary Examiner

U.S. Cl. X.R.

33—174, 201